Patented Dec. 6, 1938

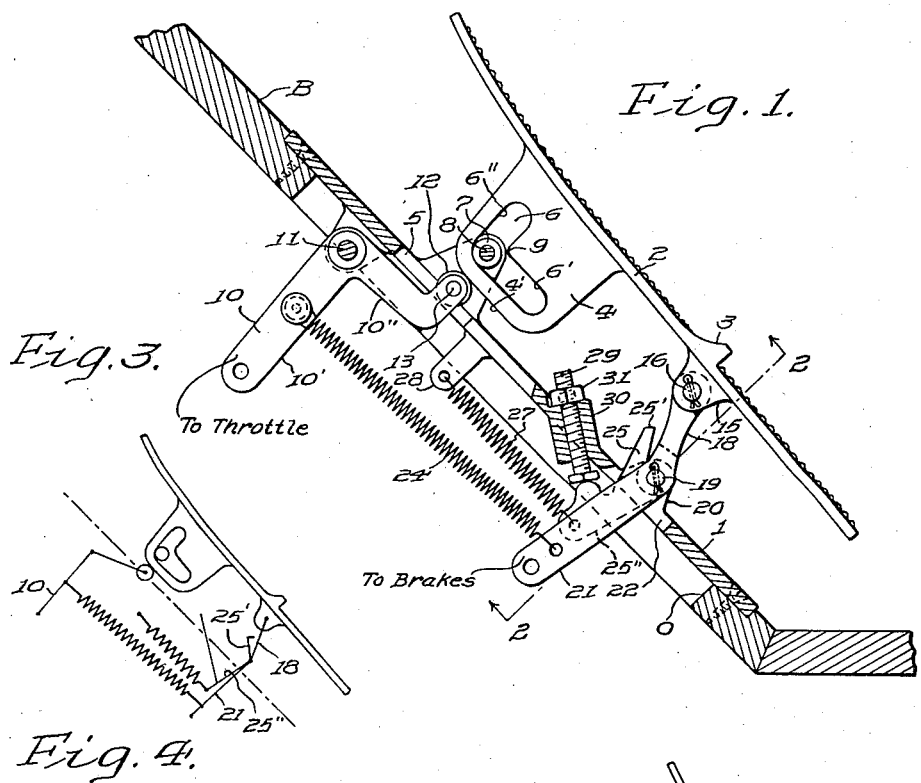
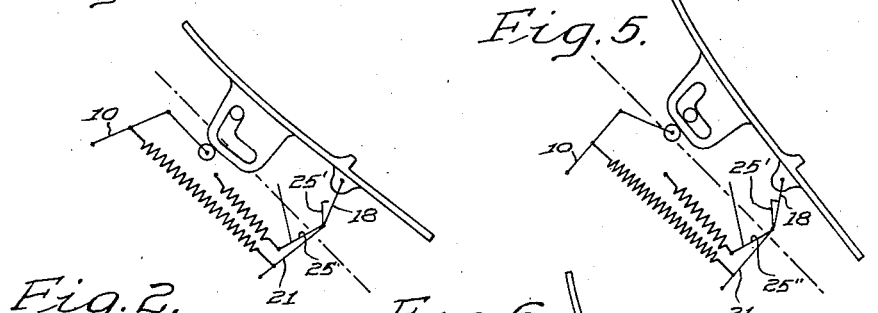
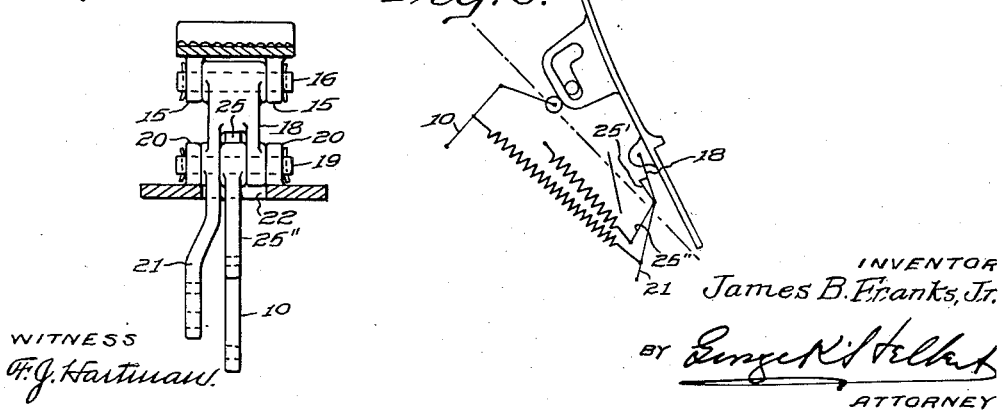

2,139,010

UNITED STATES PATENT OFFICE 2,139,010

FOOT CONTROL DEVICE

James B. Franks, Jr., Philadelphia, Pa., assignor to Andrew R. McCown, Philadelphia, Pa., as trustee Application April 16, 1936, Serial No. 74,726

16 Claims. (Cl. 192—3)

This invention relates to control devices for motor vehicles, its primary object being to provide an improved mechanism for operating the brakes and the throttle from a single foot actuated pedal to thereby facilitate the management of the vehicle and avoid the necessity of moving the foot from the accelerator pedal to the brake pedal or vice versa as is essential when these parts are separated as in customary automotive practice.

I am aware that numerous foot control devices designed to accomplish this primary object of the present invention have been proposed but those with which I am familiar have been unsatisfactory for one reason or another under practical conditions of operation and consequently none of them has gone into general use. My improved control device is devoid of these objections and in addition embodies certain features and advantages which render it eminently fitted for its intended purpose and which promote safe, comfortable and flexible control of the vehicle of which it forms a part.

In addition to the primary object of the invention to which reference has been made, other objects are, more specifically, to provide a foot control device of the character aforesaid so constructed that the brakes and throttle can be actuated selectively but not simultaneously; which can be operated either to apply the brakes or to actuate the throttle by a normal, easy and comfortable movement of the foot; which minimizes the fatigue incident to driving the vehicle for long periods of time; which embodies means whereby the operator, after closing the throttle, may "set" the brakes sufficiently to insure subsequent immediate application thereof if desired and obtain through the device a sensible indication of when they are so set in a manner analogous to the common practice of "taking up the slack" in a mechanically operated brake so as to bring the brake shoes into very light contact with the drums preparatory to a possible further and more severe application; which is devoid of springs of a character such that breakage thereof might entail serious consequences; which is simple in design and construction, and may therefore be manufactured at a relatively low cost and in which the parts are of such character as to minimize wear with corresponding increase in operative life.

Other objects, advantages and novel features of design, construction and arrangement comprehended by the invention are hereafter more particularly pointed out or will be apparent to those skilled in the art from the following description of one embodiment thereof as illustrated in the accompanying drawing in which Fig. 1 is a side elevation of the device, with certain parts shown in vertical section, in operative association with the floor board of a motor vehicle, the parts in this figure being in neutral position; and Fig. 2 is a fragmentary transverse section on line 2—2 in Fig. 1.

Figs. 3 to 6 inclusive are diagrammatic views respectively illustrating the positions of the parts under different conditions;

Fig. 3 showing them in the position corresponding to Fig. 1;

Fig. 4 showing them in a position in which the throttle is fully open and the brakes off;

Fig. 5 showing them in a position in which the throttle is closed, and the brakes applied just sufficiently to bring the brake shoes lightly in contact with the brake drums, and Fig. 6 showing them with the throttle closed and the brakes fully applied.

In all the figures the same characters of reference designate like parts.

Referring now more particularly to Figs. 1 and 2, the particular embodiment of the invention therein illustrated comprises a base 1 of generally plate-like form adapted to overlie an opening O in the foot board B of the motor vehicle of somewhat smaller area than the base. At a convenient distance above the base is disposed the pedal or foot rest 2 which may in planary outline substantially conform to the sole of a shoe and which at a suitable point between its ends may be provided with a stop 3 for engagement by the front face of the operator's heel. Under its forward or toe portion substantially below the point where the ball of the operator's foot would normally rest, the pedal is provided with a downwardly depending lug 4, and the base is slotted at 5 in alignment therewith to enable the fore part of the lug to pass through it. The lower edge 4' of this lug extends substantially parallel to the base and within the body of the lug is a generally L-shaped slot 6 having one branch 6' extending substantially parallel to edge 4' and its other branch 6" extending substantially at right angles thereto. Within this slot is disposed a guide element desirably in the form of a hardened roller 7 journaled on a pin 8 supported in upstanding transversely spaced lugs formed on the base, the diameter of the roller being very slightly less than the general width of the slot so that it is capable of traversing either branch thereof. The outer walls of the two branches of the slot are merged into each other adjacent their point of juncture on an arc conforming to the guide element, and the point of juncture 9 of the inner walls is disposed substantially on a line lying at an angle of about 45° to the base and coincident with the center of the element, while the side walls of that part of the slot comprised in branch 6'' preferably conform to arcs struck from the center of the pedal pivot pin 16 hereinafter described so as to eliminate any arcuate movement of the said pin when the front end of the pedal is depressed.

Beneath the base at a point somewhat in advance of lug 4 a bell crank lever 10 is pivotally mounted on a pin 11 carried in a depending lug or lugs on the base, one arm 10' of this lever extending generally downward substantially normal to the base and the other arm 10'' extending rearwardly more or less parallel thereto and being upturned and forked at its extremity to receive a roller 12 supported on a pivot pin 13 for coaction with the lower edge 4' of lug 4, the roller normally projecting through slot 5 into engagement with the lug. Arm 10' of the lever is adapted for connection by suitable means (not shown) to one of the instrumentalities which the foot control is designed to operate, for example the throttle, the connection being such that when the lever is turned clockwise, viewed as in Fig. 1, the throttle will be opened.

At a considerable distance behind the lug and desirably substantially in alignment with stop 3, the foot pedal is provided with depending transversely spaced lugs 15 supporting a pivot pin 16 on which is journaled, between the lugs, the upper end of a link 18, the lower end of which is journaled on a pin 19 disposed somewhat in rear of pin 16 and carried by generally similar transversely spaced lugs 20 rising from the base so the link occupies a forwardly and upwardly inclined position and is free to oscillate relatively to the pins. As best shown in Fig. 2, the link comprises a downwarly depending arm 21 which passes freely through an opening 22 in the base and is adapted for connection by suitable means (not shown) with the other instrumentality the foot control is designed to operate, for example, the actuating valve or other control element of a power braking mechanism adapted to mechanically, as distinguished from manually, apply the brakes. In the specific embodiment of the invention now being described, this connection with the actuating valve or other control element is effected in such manner that when arm 21 is moved in a counterclockwise direction, viewed as in Fig. 1, the brakes are applied and vice versa; in other words, when arm 21 moves rearwardly the brakes are applied and when arm 10' of lever 10 moves forwardly the throttle is opened.

Lever 10 and arm 21 are interconnected by a tension spring 24 in such manner that the spring constantly tends to draw them together with sufficient force to maintain the various parts in neutral (Fig. 1) position, in which guide roller 7 is disposed in the curve at the junction of the branches of slot 6 and roller 12 in engagement with the under face 4' of lug 4, the pivotal centers of these rollers lying substantially in a plane normal to support 1.

In the operation of a motor driven vehicle it frequently happens that the driver feels he may wish to make a quick and powerful application of his brakes at some relatively near but as yet undetermined time as, for example, when he observes that a preceding car is slowing down for an intersection or the like, and under such circumstances in a car provided with independent accelerator and brake pedals, it is customary practice to remove the foot from the former and transfer it to and depress the latter a sufficient distance to take up the slack in the brake system if the car is equipped with mechanical brakes, or to actuate the brake control valve if it is equipped with power brakes, sufficiently to bring the brake shoes into light contact with the brake drums so that if it later becomes necessary to apply the brakes quickly and powerfully, a more rapid braking effect can be obtained than if the foot has to be first moved from the accelerator to the brake pedal and the latter then fully depressed or even if the foot has been placed on the brake pedal but the latter not depressed at all. When a car is equipped with a foot actuated brake it is very easy for the driver to sense the amount of pedal depression required to effect the condition just described but when equipped with power operated brakes it is often a much more difficult matter to determine the exact degree of preliminary application desired, the resistance of the brake pedal or other operator operated part giving little or no sensible indication of the extent of brake application, so that the driver is compelled to judge more from the behavior of the car itself than from the "feel" of the brake pedal the extent of brake application obtained.

The present control device, however, is adapted to afford the driver a definite and sensible indication that the brakes have been applied sufficiently to bring the shoes lightly against the drums and thereby enable him to hold them in that condition until circumstances dictate either their further application or release, and to this end I provide mechanism embodying yieldable means disposed in the path in which link 18 moves during application of the brakes adapted for engagement thereby following an initial application sufficient to bring the brake shoes into light engagement with the drums and to thereafter move with the link during further application and afford increased resistance to the pedal movement required therefor.

More specifically, this mechanism comprises a movable vertically disposed stop 25 pivoted on pin 19 in a recess or fork formed at the lower end of the link 18 and having one arm 25' extending upwardly and forwardly from the pivot and another arm 25'' extending downwardly therefrom in alignment with an abutment adapted to limit the forward or clockwise movement of arm 25'' which depends through opening 22 in the base, together with yieldable means such as a spring 27 interposed between said arm and a lug 28 on the base operative to normally draw the arm against the abutment. This latter may be either fixed or, preferably and as shown, may comprise a headed screw 29 threaded through a boss 30 on the base and carrying a lock nut 31 whereby through suitable adjustment of the screw the position of lever 25 may be regulated so that its upper arm 25' will be contacted by the forwardly moving link just as the brake shoes reach the drums. Thereafter during the further forward movement of the link incident to any further application of the brakes, the link carries the lever with it against the pull of spring 27 which thus supplements the pull of spring 24, as hereinafter more fully described, whereby the operator is required to exert a greater force to thereafter move the pedal than was initially required to move it prior to contact of link 18 with lever 25.

Operation

It will be assumed the several parts have been constructed and assembled substantially as heretofore described, lever 10 connected to the throttle of the vehicle so that its clockwise movement will open the throttle and vice versa, arm 21 connected to the brake actuating valve or other control element in such manner that its counterclockwise movement will apply the brakes through operation of the power braking unit and vice versa, and that the control device is in neutral position as actually shown in Fig. 1 and diagrammatically in Fig. 3. By now depressing the front portion of the pedal, the operator can initially open the throttle since the downward movement of lug 4 depresses roller 12 and in turn swings lever 10 clockwise, but this downward movement of the pedal almost immediately brings point 9 to a position in which it precludes any relative movement between lug 4 and guide roller 7 save in branch 6'' of the slot, with the result that link 18 and pivot pin 16 are maintained in fixed position and the pin thus forms a fixed center about which the pedal can be oscillated within the limits permitted by the said branch of the slot either to fully open the throttle by further depression of the pedal or to close it by a reverse movement induced by spring 24, which always tends to turn lever 10 counterclockwise when the pressure on the pedal is released. Thus by an easy and natural movement of the front part of the operator's foot, he is able to control the extent of throttle opening as desired, while the heel of his foot is afforded solid and comfortable support by the rear portion of the pedal on which it rests. When the throttle is fully open, the parts thus occupy the position shown in Fig. 4 and when the pressure on the pedal is released they automatically return to that shown in Fig. 3.

When it is desired to apply the brakes, the operator imparts a generally downward pressure to the heel portion of the pedal by simply initially moving his foot about his ankle joint, the first effect of which is to cause the pedal as a whole to move slightly forward substantially parallel to the base, link 18 meanwhile turning about pin 19, thus bringing the point 9 to a position with respect to guide roller 7 such that relative movement between the lug and roller except in branch 6' of the slot is inhibited, with the result that it becomes impossible, irrespective of the direction of additional pressure thereafter applied to the pedal, to open the throttle. As further pressure is applied to the rear part of the pedal, link 18 continues to move in a counterclockwise direction against the tension of spring 24, since lever 10 is now held in a fixed position through contact of roller 12 with lug 4, until the link encounters arm 25' of lever 25, thus indicating to the operator, assuming he is depressing the pedal relatively slowly, that a point has been reached at which the brake shoes are in light engagement with the drums, since, during the movement just described, arm 21 has turned counterclockwise sufficiently to produce this result through the medium of the brake valve or other control element which it actuates. The operator may now maintain the pedal in that position as diagrammatically shown in Fig. 5 pending a decision whether to further apply the brakes or to release them entirely by retracting the pressure he is exerting on the pedal, or he may immediately continue the pressure on the pedal so as to move the link and arm 25' of stop lever 25 as a unit still further against the now combined pull of springs 24 and 27 until the desired extent of brake application is obtained, thereafter maintaining the pedal in that position or further applying or releasing the brake as desired by holding the pedal stationary, further depressing it, or permitting it to return to its normal position. Fig. 6 diagrammatically illustrates the position of the parts on full application of the brake, and it will be observed that in both this figure and the preceding one the accelerator is fully locked against any movement whatsoever through the coaction of guide roller 12 with the walls of branch 6' of slot 6.

Obviously if the abutment cooperative with stop lever 25 be made adjustable as shown, the position of the lever may be altered to afford the operator a sensible indication through the control device of any desired degree of brake application, but with a view to reduction of cost, the abutment may merely comprise a suitable lug on the support positioned so as to give the said indication at any point determined by the maker of the car.

It may be noted that in case of breakage of either spring 24 or 27 the operator is thereafter fully able to apply the brakes by operation of the pedal in the ordinary manner, thus eliminating the likelihood of occurrence of an accident under such conditions. Normally, of course, if spring 24 is the only one depended on to close the throttle after it has been opened, satisfactory throttle control following breakage of this spring would be impossible, but to guard against this contingency one or more additional springs of sufficient power to return the lever to neutral position independently of spring 27 may be located at some point in the connections between the throttle and lever 10 if desired.

It will, of course, be appreciated that while it will ordinarily be preferred to connect the lever 10 and arm 21 respectively with the throttle and brake valve or other brake control element, the control device will also operate satisfactorily if these connections are reversed so that depression of the front part of the pedal is effective to apply the brakes and depression of the rear part to open the throttle.

While I have herein described one embodiment of my invention with considerable particularity, I do not thereby desire or intend to restrict myself specifically thereto as, if desired, numerous changes and modifications may be made in the design, construction and arrangement of the parts without departing from the spirit and scope of the invention as defined by the appended claims.

Having thus described my invention, I claim and desire to protect by Letters Patent of the United States:

1. In a foot control device, a movable foot pedal, a lever pivoted adjacent the pedal and adapted for connection to a part to be actuated, movable means pivotally interconnected at one end with the pedal and at its opposite end adapted for connection to another part to be actuated and pivotally supported between said ends, means carried by the pedal for moving the lever when the pedal is moved pivotally about its connection with the movable means, and means cooperative therewith to maintain the movable means in fixed position during said pivotal movement of the pedal.

2. In a foot control device, a base, a movable foot pedal in superposed relation thereto, a link extending between the pedal and the base pivotally connected to each of said parts and having an arm projecting beyond its pivotal connection with the base adapted for connection to a part to be actuated, a lever adapted for connection to another part to be actuated, means carried by the pedal operative to move said lever when the pedal is moved about its point of pivotal connection with the link, and means for selectively holding the link stationary during said movement of the pedal and for holding the lever stationary during movement of the pedal and link about the point of pivotal connection of the latter with the base.

3. A foot control device for a motor vehicle comprising a pivoted link having a projecting arm for controlling the vehicle brakes, a pivoted lever for controlling the fuel supply of the vehicle, a pedal pivoted to one end of the link having an operative connection with the lever, and means for maintaining the lever in inoperative condition when the pedal is operated to move the link about its pivot and for maintaining the link in inoperative condition when the pedal is operated to move the lever about its pivot comprising a guide element and a lug having a generally L-shaped slot receiving the guide element.

4. A foot control device comprising a base, a movable foot pedal spaced thereabove, a lug embodying a slot carried by one of said parts, a guide element carried by the other part extending into and cooperative with the walls of the slot to selectively constrain the pedal to move in predetermined paths, a lever pivoted to the base for actuation by the pedal to operate one control element, and a link pivoted to the base and the pedal comprising an arm for actuation by the pedal to operate another control element.

5. A foot control device comprising a base, a movable foot pedal spaced thereabove having a depending lug embodying a slot, a lever pivoted to the base for actuation by the lug, a guide element extending into and cooperative with the walls of the slot to selectively constrain the pedal to move in predetermined paths, a link interposed between the base and the pedal, respectively pivoted to each and comprising an arm, and spring means tending to draw said lever and arm together.

6. A foot control device comprising a base, a movable foot pedal spaced thereabove having a depending lug embodying a generally L-shaped slot, a lever pivoted to the base having one end adapted for engagement by the lug, a guide element mounted on the base extending into the slot and adapted by cooperation with the walls of either branch thereof to selectively constrain the pedal to move in predetermined paths, a link interposed between the pedal of the base, pivotally connected to each and inclined toward the lug from its point of connection with the base, said link comprising an arm, and a spring interposed between said arm and said lever tending to draw them together.

7. In a foot control device, the combination of a base, a movable foot pedal disposed thereabove, a link interposed between the pedal and the base in inclined relation to the latter and pivotally connected to the base and to the pedal at its opposite ends comprising an arm extending below the base, a lug depending from the pedal at a point spaced from the link having a generally L-shaped slot with one branch extending substantially parallel to the base, a bell crank lever pivoted beneath the base having one end adjacent the lug for actuation thereby, a guide element carried by the base and received into the slot adapted by cooperation with the wall of either branch thereof to selectively constrain the pedal to move in predetermined paths, and a spring interposed between said lever and said arm tending to constantly draw them together and maintain the lug in such position that the guide element rests at the junction of the branches of the slot.

8. In a foot control device, the combination of a movable foot pedal in spaced relation thereabove, a link interposed between the pedal and the base and pivotally connected to each, said link lying in forwardly inclined position with respect to the base and having a downwardly extending arm, a lug depending from the pedal at a point spaced from its point of connection with the link, a lever pivoted to the base for coaction at one end with the lower edge of the lug, yielding means tending to draw the lever and the arm together, and means operative to selectively constrain the pedal to move in different paths to respectively move the lever or the link and arm against the tension of the yielding means in accordance with the point of application of pressure to the pedal with respect to its point of connection with the link.

9. In a foot control device, the combination of a base, a movable foot pedal disposed in spaced relation thereabove having a depending lug, a link interposed between the pedal and the base, a pivot connecting one end of the link with the pedal at a point remote from the lug and a pivot connecting the other end of the link with the base at a point still further remote therefrom whereby the link is inclined from the base toward the lug, an arm extending downwardly from the link, a lever pivoted to the base for engagement at one end by the lower edge of the lug, and means comprising a slot in the lug and a guide element cooperative therewith operative to selectively constrain the pedal to move in different paths as determined by the point of application of a depressing force to the pedal with respect to its point of connection with the link and thereby selectively actuate the lever or the arm.

10. In a foot control device, the combination of a base, a movable foot pedal disposed in spaced relation thereabove having a depending lug, a link interposed between the pedal and the base, a pivot connecting one end of the link with the pedal at a point remote from the lug and a pivot connecting the other end of the link with the base at a point still further remote therefrom whereby the link is inclined from the base toward the lug, an arm extending downwardly from the link, a lever pivoted to the base for engagement at one end by the lower edge of the lug, means comprising a slot in the lug and a guide element cooperative therewith operative to selectively constrain the pedal to move in different paths as determined by the point of application of a depressing force to the pedal with respect to its point of connection with the link and thereby selectively actuate the lever or the arm, and yieldable indicating means comprising a lever interposed in the path of movement of the link, an abutment on the base engageable by the lever, and a spring tending to draw the lever against the abutment in a direction to oppose the movement of the link.

11. In a foot control device, a base, a foot pedal in spaced relation thereabove, a link extending between the pedal and the base, pivotally connected to each of said parts and lying in angular relation to the base, an arm extending downwardly from the link, a lug depending from the pedal at a point spaced from its point of connection with the link, a lever pivoted to the base extending beneath the lug for engagement thereby, a spring tending to draw the lever and said link arm together, a stop lever having a part interposed in the path of movement of the link, means adapted to limit the movement of the stop lever in one direction, and a spring tending to draw said lever thereagainst, whereby depression of the pedal on one side of its point of connection with the link is effective to initially cause the latter to move toward the stop lever and thereafter to turn the stop lever unitarily with the link again the combined tension of the springs.

12. A foot control device comprising a base, a movable foot pedal in superposed relation thereto, a link extending between said parts and pivotally connected to each, a lever carried by the base adapted for connection to a part to be actuated, means carried by the pedal operative to move the lever when the pedal is depressed about its point of pivotal connection with the link, an arm extending from the link adapted for connection to another part to be actuated, and means for holding the link in fixed position when a force tending to depress the pedal is applied thereto on one side of its said pivotal connection and for preventing movement of the lever by said lever moving means when a generally like force is applied to the pedal on the opposite side of said pivotal connection.

13. A foot control device comprising a base, a movable foot pedal in superposed relation thereto, a link extending between said parts and pivotally connected to each of them, a lever adapted for connection to a part to be actuated, means carried by the pedal on one side of its point of pivotal connection with the link operative to move the lever when the pedal is depressed about said point as a fixed center, an arm carried by the link adapted for connection to another part to be actuated, yielding means interconnecting the arm and the lever tending to draw them together, and means operative to maintain the link and its arm stationary while a force tending to depress the pedal is applied thereto on one side of said point and to prevent movement of the lever while a generally like force is applied to the pedal on the opposite side of said point to move the link and its arm.

14. A foot control device comprising a base, a foot pedal in superposed relation thereto, a link extending between said parts and pivotally connected to each of them, a lever carried by the base adapted for connection to a part to be actuated, means carried by the pedal on one side of its point of pivotal connection with the link adapted to actuate the lever when the pedal is turned about said point as a fixed center, an arm carried by the link adapted for connection to another part to be actuated, yielding means interconnecting the arm and the lever, and means operative to inhibit movement of the link when a force tending to depress the pedal is applied thereto on that side of said point adjacent the lever actuating means to thereby move the lever and to prevent actuation of said means when a generally like force is applied to the pedal on the opposite side of said point to thereby move the link and arm.

15. A foot control device comprising a base, a foot pedal in superposed relation thereto, a link extending between said parts and pivotally connected to each of them, a lever carried by the base adapted for connection to a part to be actuated, means carried by the pedal on one side of its point of pivotal connection with the link adapted to actuate the lever when the pedal is turned about said point as a fixed center, an arm carried by the link adapted for connection to another part to be actuated, yielding means interconnecting the arm and the lever, means operative to inhibit movement of the link when a force tending to depress the pedal is applied thereto on that side of said point adjacent the lever actuating means to thereby move the lever and to prevent actuation of said means when a generally like force is applied to the pedal on the opposite side of said point to thereby move the link and arm, and a yielding stop interposed in the path of the link engageable thereby at a point between the extremities of its path of movement.

16. A foot control device comprising a base, a foot pedal in superposed relation thereto, a link extending between said parts and pivotally connected to each of them, a lever carried by the base adapted for connection to a part to be actuated, means carried by the pedal on one side of its point of pivotal connection with the link adapted to actuate the lever when the pedal is turned about said point as a fixed center, an arm carried by the link adapted for connection to another part to be actuated, yielding means interconnecting the arm and the lever, means operative to inhibit movement of the link when a force tending to depress the pedal is applied thereto on that side of said point adjacent the lever actuating means to thereby move the lever and to prevent actuation of said means when a generally like force is applied to the pedal on the opposite side of said point to thereby move the link and arm, a movable stop extending into the path of the link, means for determining the position of the stop in said path, and yielding means interconnected with the stop, the stop being engageable by the link following a predetermined movement along said path and thereafter movable therewith against the combined tension of the yielding means respectively interconnected with the stop and with said arm and lever.

JAMES B. FRANKS, JR.